US012546167B2

(12) United States Patent
Kasik

(10) Patent No.: US 12,546,167 B2
(45) Date of Patent: Feb. 10, 2026

(54) STEPLADDER WITH STABILIZER

(71) Applicant: D & D VENTURES OF JUPITER, LLC, Jupiter, FL (US)

(72) Inventor: David Paul Kasik, Jupiter, FL (US)

(73) Assignee: D & D VENTURES OF JUPITER, LLC, Jupiter, FL (US)

( * ) Notice: Subject to any disclaimer, the term of this patent is extended or adjusted under 35 U.S.C. 154(b) by 736 days.

(21) Appl. No.: 17/819,571

(22) Filed: Aug. 12, 2022

(65) Prior Publication Data

US 2023/0049761 A1 Feb. 16, 2023

Related U.S. Application Data

(60) Provisional application No. 63/232,738, filed on Aug. 13, 2021.

(51) Int. Cl.
*E06C 7/42* (2006.01)

(52) U.S. Cl.
CPC .................................... *E06C 7/423* (2013.01)

(58) Field of Classification Search
CPC . E06C 7/423; E06C 7/44; E06C 7/426; E06C 1/22
See application file for complete search history.

(56) References Cited

U.S. PATENT DOCUMENTS

| | | | | |
|---|---|---|---|---|
| 806,501 | A * | 12/1905 | Rouse | E06C 1/22 182/167 |
| 1,314,719 | A * | 9/1919 | Townsend | E06C 7/44 182/200 |
| 2,857,087 | A * | 10/1958 | Pratt | E06C 1/22 182/156 |
| 3,102,606 | A * | 9/1963 | Hopfeld | E06C 7/44 182/202 |
| 3,568,798 | A | 3/1971 | Pierce | |
| 3,878,917 | A | 4/1975 | McBride | |
| 4,095,671 | A | 6/1978 | Forristall et al. | |
| 4,456,095 | A | 6/1984 | Hodson | |
| 4,671,383 | A | 6/1987 | Huang | |
| 4,926,968 | A | 5/1990 | Schumer | |
| 4,964,488 | A * | 10/1990 | Stewart | E06C 1/20 182/172 |
| 4,971,167 | A * | 11/1990 | Winnard | E06C 7/423 182/165 |
| 5,307,900 | A | 5/1994 | Noga | |
| 5,944,142 | A * | 8/1999 | Milner | E06C 7/44 182/202 |
| 6,053,284 | A | 4/2000 | Fountain | |
| D468,448 | S | 1/2003 | Blehm | |
| 6,527,084 | B2 * | 3/2003 | Hrincu | E06C 7/44 182/180.2 |
| 8,590,671 | B2 * | 11/2013 | Potter | E06C 1/12 182/171 |
| 10,865,602 | B1 * | 12/2020 | Varshavsky | E06C 7/04 |
| 12,264,541 | B1 * | 4/2025 | Georges | E06C 7/48 |
| 2004/0144595 | A1 * | 7/2004 | Hanison | E06C 7/44 182/180.2 |

* cited by examiner

*Primary Examiner* — Gisele D Ford
(74) *Attorney, Agent, or Firm* — McHale & Slavin, P.A.

(57) ABSTRACT

A stepladder accessory that allows a stepladder to be configured for use on a stairway or inclined surface. The accessory is a stabilizer that is adapted for removable mounting to a stepladder. The stabilizer includes securement means, mounting structure, and a telescoping support structure. The securement means and mounting structure can be integrated.

16 Claims, 6 Drawing Sheets

STEPLADDER WITH STABILIZER

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/232,738, entitled "STEPLADDER WITH STABILIZER", filed Aug. 13, 2021. The contents of the above referenced application are incorporated herein by reference in their entirety.

FIELD OF THE INVENTION

A stepladder with a stabilizer that can be used on steps to provide a stable work platform.

BACKGROUND OF THE INVENTION

Stepladders are well known in the art. They comprise a portable, self-supporting, A-frame ladder. It has two front side rails and two rear side rails. There are steps secured between the front side rails and bracing between the rear side rails. Spreaders are connected to and extend between the respective front and rear side rails to selectively fix the ladder in its open A-frame configuration. The rear side rails can be fixed in spaced apart relationship with cross supports extending therebetween. In heavy duty stepladders, reinforcing braces can be positioned between the steps and their respective side rails, and the rear supports and their respective side rails. Typically, a stepladder is provided with a top that provides a work surface or one or more tool storage devices. The rear side rails and the front side rails are hingedly connected together, typically adjacent the top. The front and rear side rails can be provided with anti-slip feet on their lower ends. Typically, the front and side rails are made out of a fiberglass material, metal such as aluminum, or wood. Wood and fiberglass are nonconductive and are preferred in an environment where a worker might be exposed to a source of electricity. In use, it is recommended that the top and the top step of the ladder not be used for climbing or standing.

In the use of a stepladder, the rear and front structures forming the A-frame are latched into that configuration by the spreaders, which are selectively hinged apart adjacent the bottom ends. This A-shaped configuration is typically used when the stepladder is to be used for work. The stepladder is put in its collapsed configuration for storage. However, the stepladder can be used like an extension ladder in its collapsed configuration by leaning the top plate against a support structure, like a wall.

While stepladders are versatile and frequently used to provide an elevated working position for a worker, they should be used on a level support surface, such as a floor. There is often a need for an elevated working platform for a worker on steps or an inclined surface. A stepladder is not configured for stable use on steps, because a step configuration does not provide a level work surface large enough for both the front rails and the rear rails to rest on simultaneously. There is thus a need for an improved stepladder construction to allow its use on two surfaces that are not in the same plane.

DESCRIPTION OF THE PRIOR ART

U.S. Pat. D468,448 shows a leg attachment construction for an extension ladder to allow it to be used on an uneven surface. Such constructions are well known in the art, but do not relate to using the stepladder where the steps on the ladder are parallel to steps in a building. U.S. Pat. No. 6,053,284 shows a stabilizing support frame for an extension ladder. It involves a complex structure of a base frame and generally upright supports but is not adapted for use to stabilize a ladder that needs to rest on two different levels of surfaces. U.S. Pat. No. 5,307,900 discloses a leg extension apparatus for use on an extension ladder to accommodate the extension ladder being used on a sloping surface. U.S. Pat. No. 4,926,968 discloses a stepladder construction with stabilizers secured to the front rails used to provide lateral support during use of the stepladder. U.S. Pat. No. 4,671,383 discloses a ladder leveler for use on an extension ladder to accommodate its use on non-extensive different level surfaces. U.S. Pat. No. 4,456,095 discloses a leveling device for extension ladders when used on an uneven or sloping surface. U.S. Pat. No. 4,095,671 discloses an adjustable self-locking level support for extension ladders. Like some of the above mentioned patents, this device allows an extension ladder to be used on a sloping surface. U.S. Pat. No. 3,878,917 discloses an adjustable ladder support attachment for use on an extension ladder to provide lateral support for the ladder. U.S. Pat. No. 3,568,798 discloses a ladder stabilizer for use on a stepladder to provide lateral stability to the stepladder when it is open in its A-frame configuration.

Gorilla Ladders makes ladders that can be used in an A-frame configuration or an extension ladder configuration. It has identical front and rear sections, each independently adjustable for length. It can be used on steps or an inclined surface by having one section shorter than the other section. Other manufacturers provide similar ladders. They are, however, very heavy compared to a stepladder, and do not have a top plate, as do stepladders.

While the above mentioned patents disclose various means for stabilizing a ladder, none of them disclose or suggest a stepladder construction that is adapted to have the front rails rest on a first lower surface and provide means for having support for the stepladder on a second and higher surface, such as found on steps in a building, to provide additional versatility for use of a stepladder.

SUMMARY OF THE INVENTION

The instant invention provides an accessory for attachment to a collapsible stepladder that allows its use on a stairway or inclined surface.

Accordingly, it is a primary objective of the instant invention to provide an accessory attachment that can be removably attached to various types and sizes of stepladders.

It is a further objective of the instant invention that can be easily, removably attached to various stepladders.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
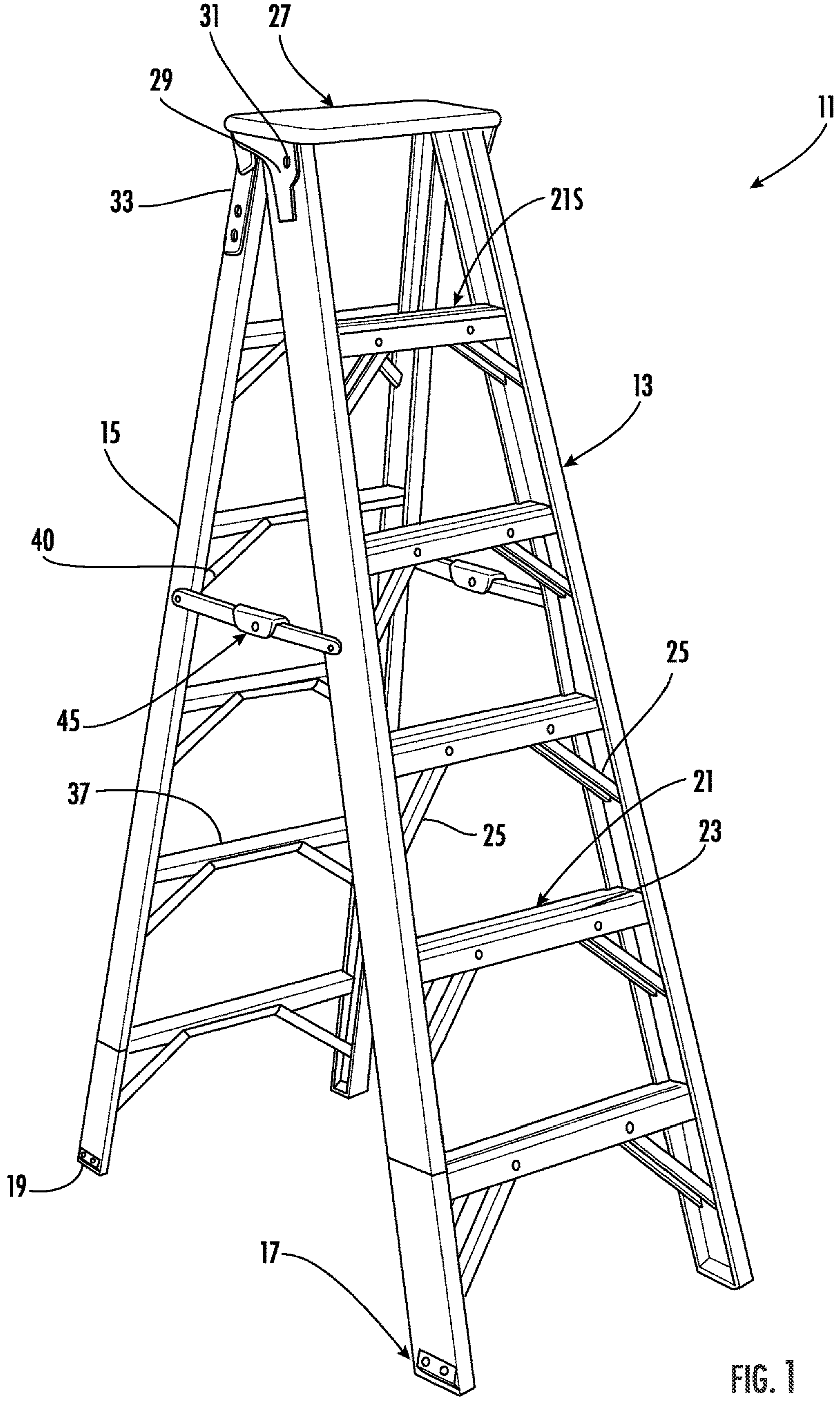
FIG. 1 is a perspective view of a stepladder.

FIG. 1 shows a stepladder, designated generally 11 that is of typical construction. It includes a pair of front side rails 13 that are in spaced apart relationship and lie in a common plane. The rails 13, generally, are spaced apart in a manner to provide a diverging relationship from the top of the stepladder 11 to the bottom of the stepladder 11. Such a diverging relationship improves stability of the stepladder 11 during use. The stepladder 11 also includes a pair of rear side rails, designated generally 15, that are in generally spaced apart relationship in a manner to also provide a diverging relationship from the top of the stepladder 11 to the bottom of the stepladder 11 and lie in a common plane. The stepladder 11 can be provided with friction increasing feet, designated generally 17 and 19, for the front rails 13 and rear rails 15, respectively. A plurality of steps 21 are secured to and extend between the front rails 13 and, in use, the top surfaces 23 thereof lie in a plane generally parallel to the supporting surface, such as a floor, not shown, when the stepladder is in its' A-frame expanded configuration. As shown, angle braces 25 can be provided and secured to and extend between portions of the steps 21 and a respective front rail 13 to increase rigidity of the stepladder 11. The stepladder 11 has a top step which is designated 21S. The stepladder 11 is also provided with a top cap 27, which is positioned at the top of the rails 13, 15 in use, and provides a work surface, a support surface, and is typically provided with tool holders, such as through holes. In use, it is recommended that the top cap 27 and top step 21 are not to be used to support a worker. The top cap 27 is secured to the front rails 13 as with brackets 29 as with using suitable fasteners, such as rivets 31. The rear rails 15 are movably mounted to the front rails 13 to allow their relative pivoting movement, as with a hinge 33 that is secured to both the rear rails 15 and the brackets 29. As shown, a plurality of cross members 37 are secured to and extend between the rear rails 15, as with rivets, to fix the relative positions of the rear rails 15. In use, it is discouraged that these cross members 37 be used as steps by a worker or the like. As shown, angle braces 40 can be provided and are secured to a respective cross support 37 and rear rail 15 to increase the rigidity of the stepladder 11. The stepladder 11 can be positioned in its expanded A-frame configuration, as shown, with the lower portions of the rails 13 and 15 being spread apart for use. The rails 13 and 15 can be moved together for storage, as is known in the art. To maintain the stepladder 11 in an A-frame configuration, a pair of spreaders 45 are provided, with each being secured to a respective rear rail 15 and front rail 13. The spreaders 45 are pivotally mounted to each of their respective rails 13, 15, and have a pivot pin connecting them together to allow folding of the spreaders 45 to effect closing of the stepladder 11. When extended, the spreaders 45 have an over-center lock configuration to prevent folding during use of the stepladder 11. The above described stepladder is well known in the art. Such ladders can be made from a metal, as for example, an aluminum alloy and perhaps a polymeric top 27. They can also be made of a combination of metal alloy, such as aluminum and fiberglass. In a typical stepladder construction, the rails 13, 15 are made of a fiberglass reinforced material. Wood stepladders are also known in the art. Positional terms, as used herein, are used in the sense of when the stepladder is in its use orientation.

FIGS. 2-5 illustrate multiple embodiments of the present invention. The various embodiments each have three basic components or structures. Those include securement means, a mounting structure, and a support structure. These are discussed below in detail for the two illustrated embodiments.

Figure 2:
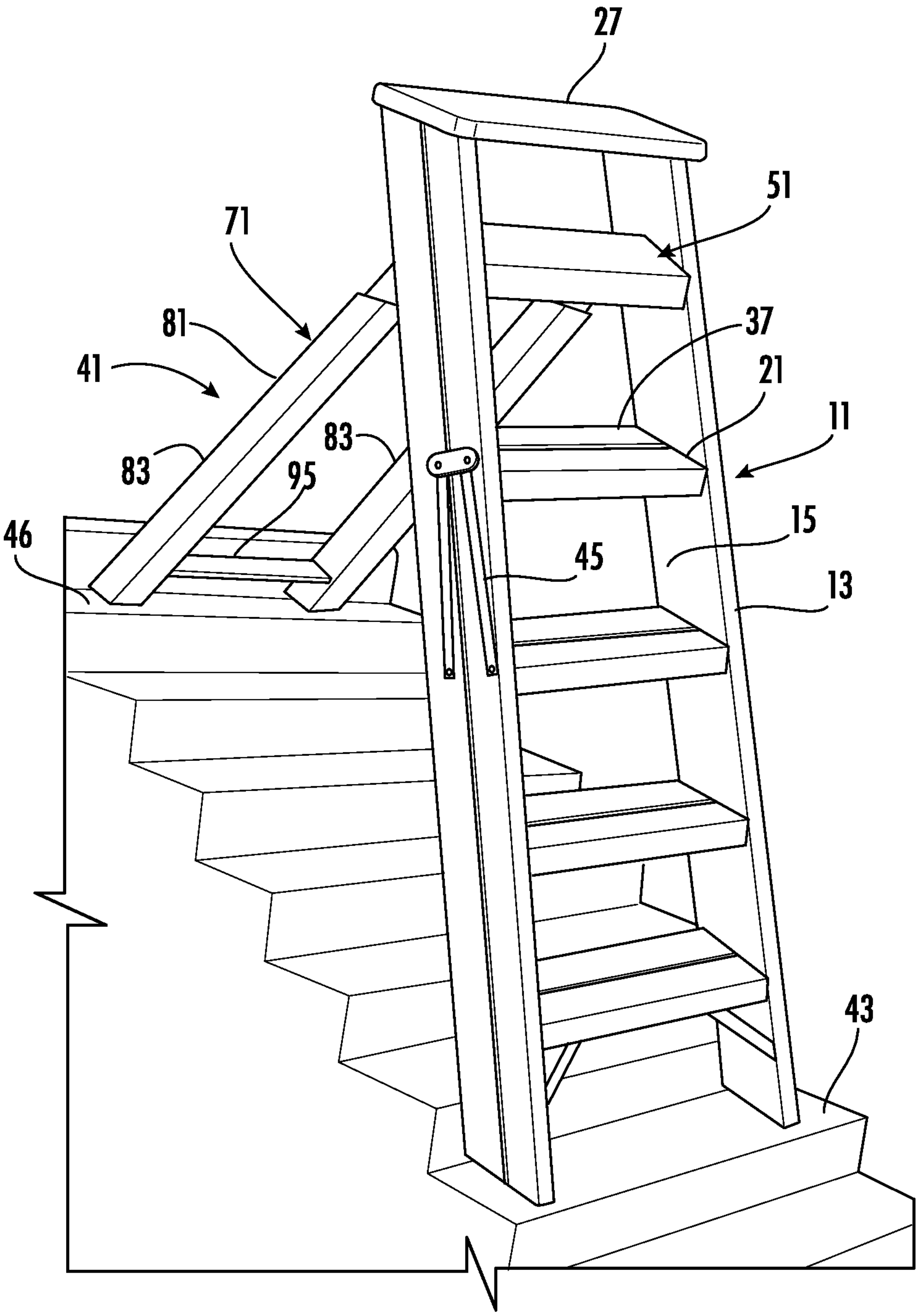
FIG. 2 is a perspective view of a stepladder with the accessory stabilizer attached.

As seen in FIG. 2, a stabilizer, designated generally 41, is removably mounted to the stepladder 11 as described below. The stabilizer 41 is shown as being removably attached to the step 21S although it is to be understood that it can be attached to a cross member 37 or to a pair of the front rails 13 or rear rails 15. Attachment to a pair of rails can be with fasteners, such as U bolts and nuts. The construction of the stabilizer 41 and its attachment to the stepladder 11 is such as to allow the stepladder 11 to be in its contracted or folded position. The stabilizer 41, when attached to the stepladder 11, is operable to allow the stepladder to be used in its folded or collapsed configuration while on a stairway with the bottom portions of the rails 13 and 15 resting on a lower step 43, while the lower ends of the stabilizer 41 rest on a higher elevation step 46 with the stepladder 11 being in a leaning back position, forming an A-frame configuration.

Figure 3:
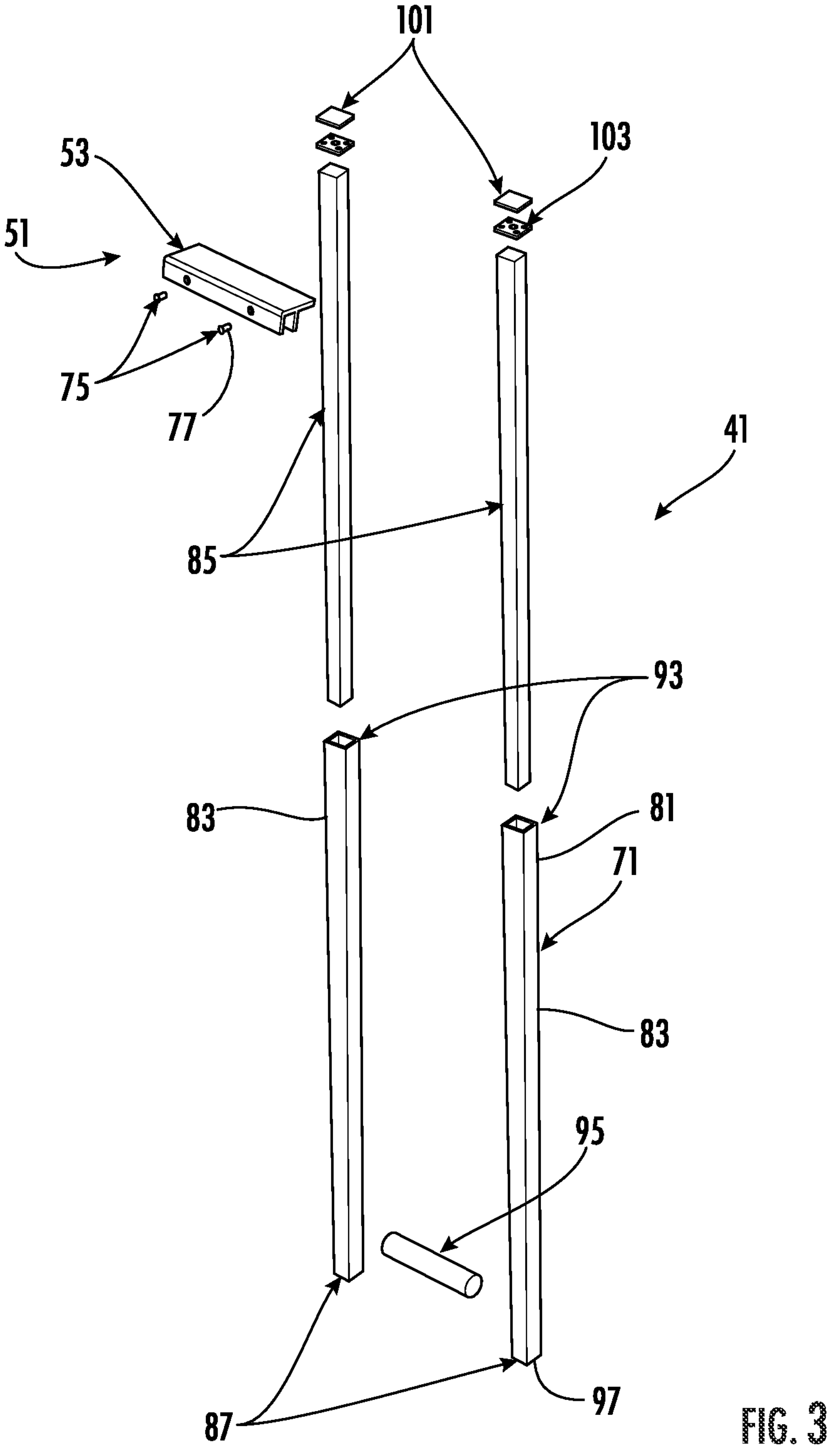
FIG. 3 is an exploded perspective view of a first form of stabilizer.
Figure 4:
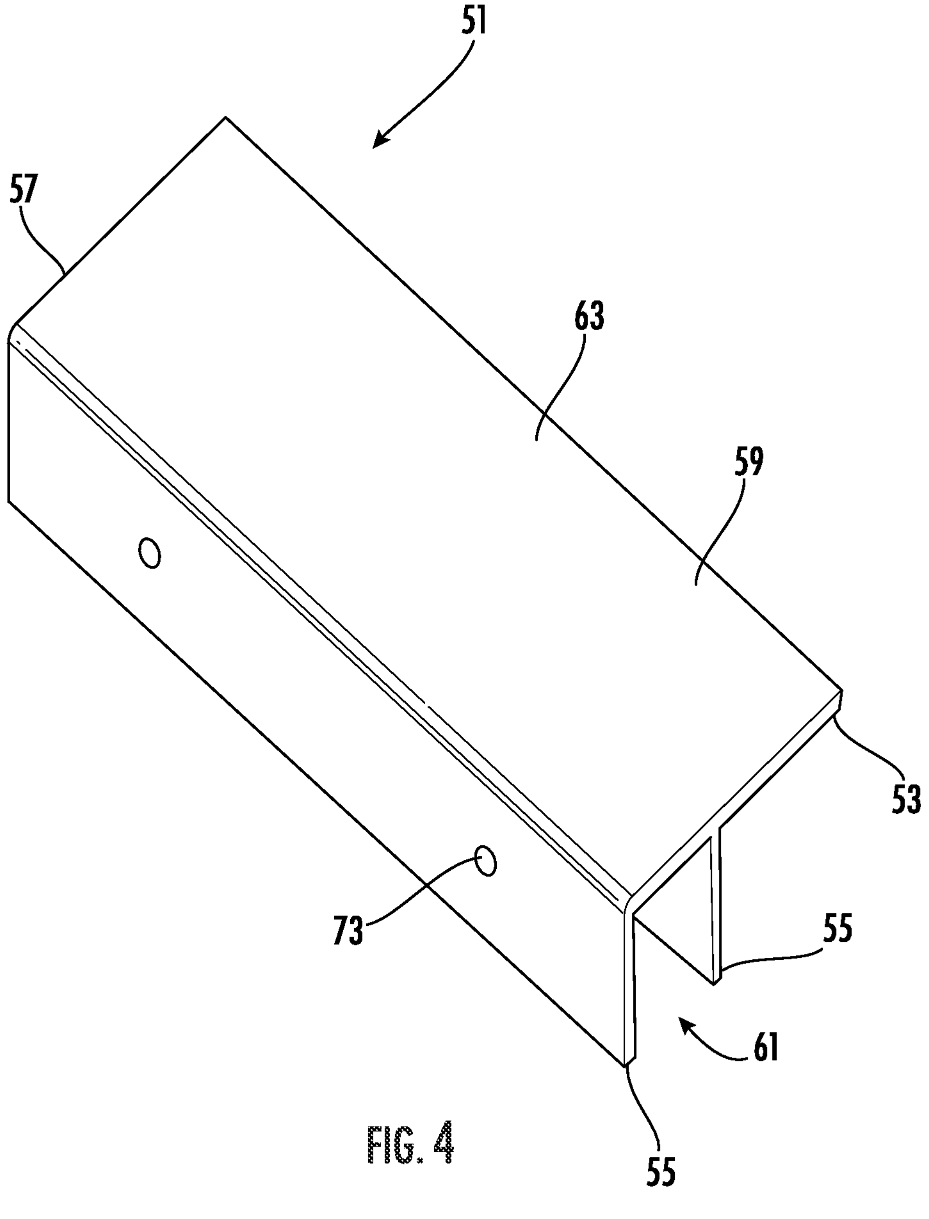
FIG. 4 is an enlarged perspective view of a mounting structure of the first form of stabilizer.
Figure 5:
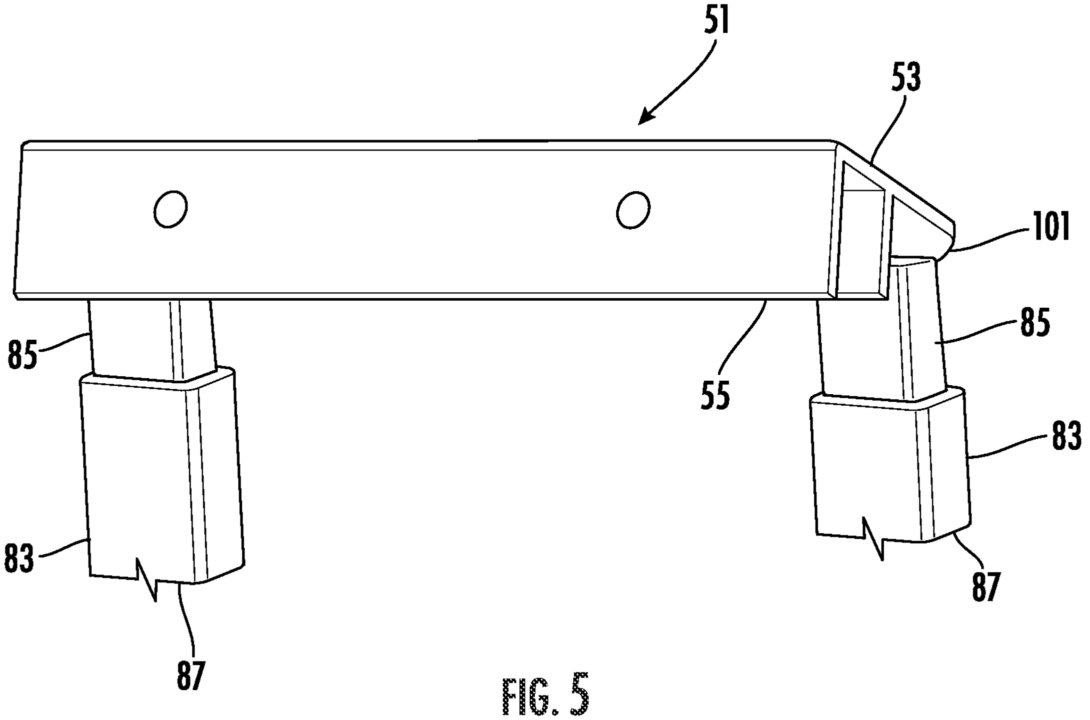
FIG. 5 is an enlarged perspective view of a mounting structure of the first form of stabilizer shown mounted on a portion of a support structure.

The stabilizer 41 of FIG. 3 includes a mounting structure, designated generally 51, that is adapted for attachment to a portion of the stepladder 11, as for example a step 21 or a cross support 37, as described below. In the illustrated structure, the mounting structure 51 includes a crossmember 53 that is best seen in FIGS. 4, 5. The crossmember 53 is in the form of an F having two depending legs 55, connected together by a bight portion 57 of a plate 59. The legs 55 and bight portion 57 form an open face channel 61, in which is received either a step 21 or a cross support 37. When the crossmember 53 is mounted to a step 21, for example the step 21S, the top surface 63 serves the same function as the top surface of the step 21S. As noted above, it is not recommended that the step 21S be used as a step for safety reasons. The plate 59 extends rearwardly from the bight portion 57 when mounted to a stepladder 11 and serves as a means for mounting a support structure 71 to the mounting structure 51. In the illustrated structure, the step 21S or cross support 37 is received in the channel 61. To removably mount the mounting structure 51 to the stepladder 11, holes 73 can be provided through both of the legs 55, with pairs of the holes 73 being aligned. In a preferred embodiment, the holes 73 have sufficient spacing from the bight portion 57 to eliminate the need for drilling holes through either the depending legs from the step 21 or a portion of the cross support 37. The securement means mentioned above can be in the form of a hitch pin 75 that can be in the form of a clevis pin, a round wire pin or a detent ball hitch pin. If the securement means is in the form of the clevis pin, it can be releasably mounted to the legs 55 via a hair spring pin 77 or the like. If a round wire pin or detent ball hitch pin is used, a separate fastener is not needed. It is to be understood that the holes 73 can be aligned with holes drilled by the user, wherein the hitch pin 75 passes through the holes 73 and the holes formed in the step 21S or cross support 37. It is also to be understood that the user of the stabilizer 41 can drill all the holes 73, and the holes not shown in either a step 21 or a cross support 37. Such would provide a custom fit. When mounted to a stepladder 11, the stabilizer 41 and the plate 59 extending from the bight portion 57 extend rearwardly through the ladder 11 for mounting of the support structure 71.

Figure 6:
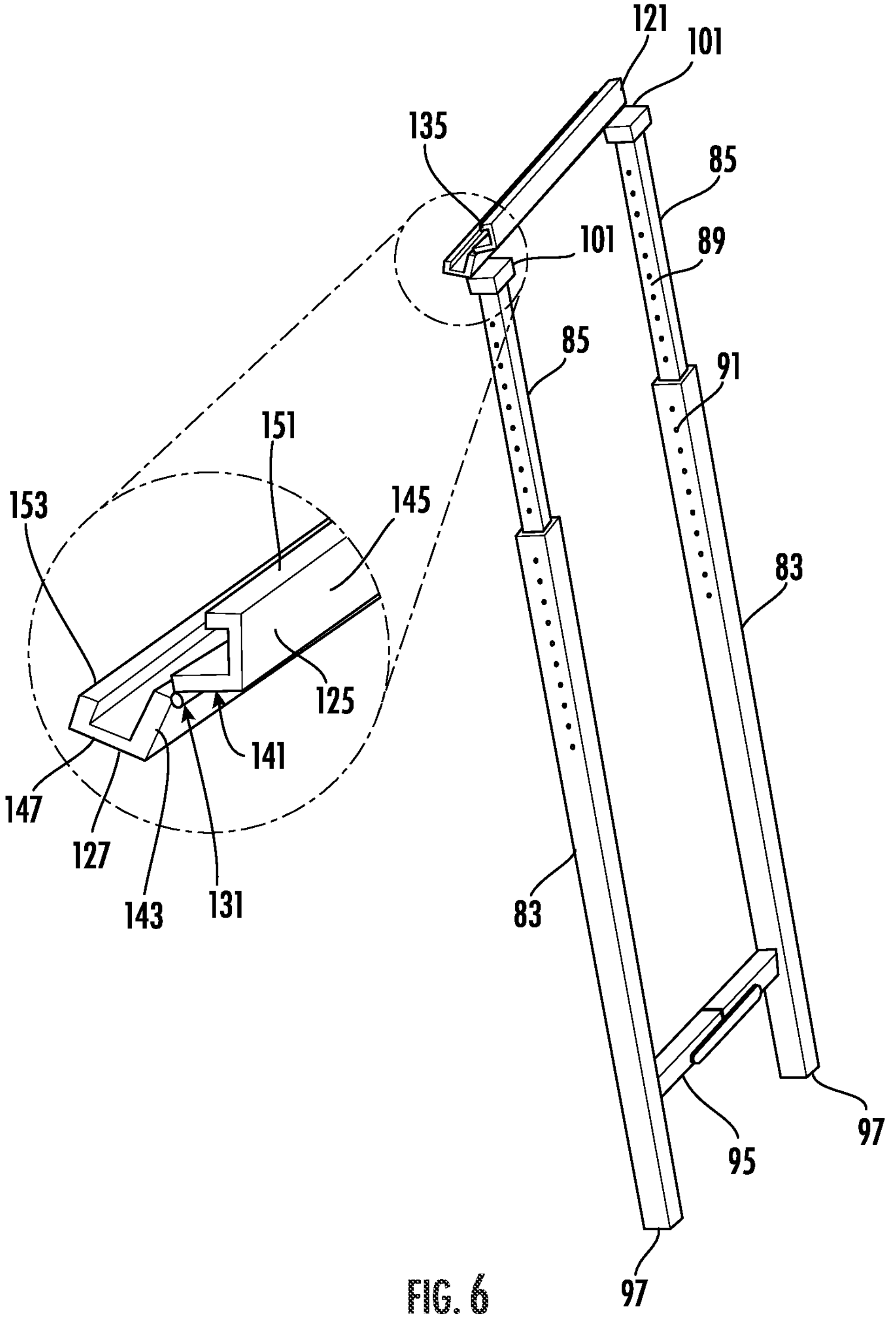
FIG. 6 is a perspective view of a second form of mounting structure of a stabilizer with integrated securement means.

The support structure 71 can be used with both illustrated embodiments of the stabilizer 41. The support structure 71 includes a longitudinally extensible frame 81 that includes a pair of telescoping legs 83, each comprising at least two tubular members, such as rectangular tubular members, one slidably mounted in another. As shown, a telescoping leg 83 is comprised of a pair of tubular members 85, 87, with the tubular member 85 being slidably received within the tubular member 87, as best seen in FIG. 6. Both of the tubular members 85, 87 are provided with a plurality of pairs of through openings 89, 91, respectively, that are aligned, allowing a hitch pin 93, such as a hitch pin 75 disclosed above, to be inserted through four aligned openings 89, 91 to fix the length of the telescoping leg 83 at a desired length. Spring button locking pins could be used in place of hitch pins. It is to be understood that only one pair of openings 91 need be provided in each tubular member 87. Preferably, the telescoping legs 83 are secured together to fix the spacing therebetween, as with a cross rung 95. Preferably, the legs 83 are of a metallic material whereby the rung 95 can be welded to form a securement between it and the legs 83. It is to be understood that a plug 97 can be inserted into the lower end of the hollow tubular members 87 to resist scarring of an underlying surface, and also to provide increased frictional contact between the support structure 71 and an underlying surface.

The mounting structure 51 is mounted to the support structure 71, preferably to form a hinged arrangement allowing hinged movement of the support structure 71 relative to the mounting structure 51 and the associated stepladder 11. As shown in FIG. 3, a pair of hinges 101 is each separately secured to a respective leg 83 adjacent an upper end thereof. Preferably, a hinge 101 is of a metallic material compatible with being welded to a respective leg 83. Other means of securement can be provided if desired. As shown in FIG. 3, an end cap 103 can be secured to the upper end of a respective tubular member 85, with a respective hinge 101 then being secured to the cap 103. The hinges 101 are oriented to provide rearward hinging of the lower end of the support structure 71 relative to the rear of the lower end of the ladder 11. If desired, the hinges 101 can provide a stop to limit the hinged movement to a desired maximum opening configuration of the stabilizer 41 relative to the ladder 11. The hinges 101 are suitably secured to the mounting structure 51, for example the crossmember 53. Such securement can be by welding or fasteners, such as nuts and screws or rivets.

FIG. 6 illustrates a second embodiment of a mounting structure and is designated generally 121; it too is mounted to the legs 83, as by being secured to the tubular members 85 as with hinges 101 as described above. The mounting structure 121 is preferably made of a metallic material suitable for being secured to the hinges 101, as by welding. As shown enlarged, the mounting structure 121 includes a pair of hingedly connected channel forming members 125, 127. The hinge connection is formed by a hinge 131 suitably secured to the channel forming members 125, 127. Securement of the hinge 131 to the members 125, 127 can be by any suitable securement means, such as welding, rivets, or nuts and screws. In the illustrated structure, in a closed configuration as seen in the unenlarged portion of the figure, the members 125, 127 form an upwardly opening channel 135. As shown, the members 125, 127 are generally C-shaped having a leg 141, 143 respectively connected to a bight portion 145, 147 respectively. Generally parallel to and having a length shorter than the length of the legs 141, 143, the members 125, 127 are each provided with a second leg 151, 153, respectively, spaced from the legs 141, 143. In mounting of the mounting structure 121, for example, to a step 21, a portion of the step is positioned between legs 141 and 151 and then hinged movement of the member 127 can form a snap lock securement to the other side of the step 121. This construction integrates the securement means with the mounting means.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A stabilizer device (41) for use with a stepladder (11) facilitating use of the stepladder on sloped and non-level surfaces, the stepladder having a pair of front side rails (13) that are in spaced apart relationship and lie in a common plane, the front side rails (13) are spaced apart in a diverging relationship from the top of the stepladder (11) to the bottom of the stepladder (11), a pair of rear side rails, designated generally (15), that are in generally spaced apart relationship in a manner to also provide a diverging relationship from the top of the stepladder (11) to the bottom of the stepladder (11) and lie in a common plane, a plurality of steps (21) secured to and extending between the front rails (13) and, in use, the top surfaces (23) thereof lie in a plane generally parallel to the supporting surface, when the stepladder is in its' A-frame expanded configuration comprising:

the stabilizer (41), removably attachable to the stepladder (11) in its folded configuration, wherein the stabilizer (41) includes a mounting structure (51) adapted for attachment to a portion of the stepladder (11), the mounting structure (51) includes a cross member (53) in the shape of an F having two depending legs (55), connected together by a bight portion (57) of a plate (59), the legs (55) and bight portion (57) forming an open face channel (61), in which a portion of the stepladder (11) is received to facilitate use of the stepladder (11) while on a sloped surface with the bottom portions of the stepladder rails (13) and (15) resting on a lower elevation portion of the sloped surface, while a lower end of the stabilizer (41) rests on a higher elevation portion with the stepladder (11) being in a leaning back position, forming an A-frame configuration.

2. The stabilizer device (41) for a stepladder of claim 1 wherein the plate (59) extends rearwardly from the bight portion (57) when mounted to a stepladder (11), and serves to mount the mounting structure (51) to the stepladder (11).

3. The stabilizer device (41) for a stepladder of claim 1 wherein the portion of the stepladder received into the mounting structure (51) is a step (21).

4. The stabilizer device (41) for a stepladder of claim 1 wherein the portion of the stepladder received into the mounting structure (51) is a cross support (37).

5. The stabilizer device (41) for a stepladder of claim 1 wherein the stepladder (11) includes a cross member step (21S) having a top surface (63) positioned at the uppermost point of the stepladder (11), the mounting structure (51) is constructed and arranged to cooperate with the cross member step (21S) to secure the stabilizer device to the stepladder (11).

6. The stabilizer device (41) for a stepladder of claim 1 wherein holes (73) are provided through both of the depending legs (55) for cooperation with a fastener to removably secure the mounting structure (51) to the stepladder (11).

7. The stabilizer device (41) for a stepladder of claim 1 wherein the stabilizer (41) includes a support structure (71) including at least two tubular legs having a first end which is rigidly secured to the mounting structure (51) to extend downwardly therefrom having a fixed length.

8. The stabilizer device (41) for a stepladder of claim 7 wherein a support structure (71) includes a longitudinally extensible frame (81) that includes a pair of telescoping legs (83), each pair of telescoping legs (83) comprising at least two tubular members, one slidably mounted in another, the telescoping legs (83) are provided with a plurality of pairs of through openings (89, 91), respectively, that are aligned, to cooperate with a fastener to fix a length of each telescoping leg (83) independently of the other.

9. The stabilizer device (41) for a stepladder of claim 8 wherein the at least two tubular members forming the telescoping legs (83) are constructed from polygonal tubing.

10. The stabilizer device (41) for a stepladder of claim 7 wherein the at least two tubular members forming the telescoping legs (83) are constructed from round tubing.

11. The stabilizer device (41) for a stepladder of claim 7 including a plug (97) inserted into a lower lowermost end of the at least two tubular members (87) forming the telescoping legs to provide increased frictional contact between the support structure (71) and an underlying surface.

12. The stabilizer device (41) for a stepladder of claim 6 including a rung (95) secured between the tubular legs (83) to provide rigidity to the stabilizer device (41).

13. The stabilizer device (41) for a stepladder of claim 6 including a pair of hinges (101) each separately secured to a respective tubular leg (83) adjacent an upper end thereof, the hinges (101) are oriented to provide rearward hinging of a lower end of the support structure (71) relative to a rear of a lower end of the ladder (11).

14. The stabilizer device (41) for a stepladder of claim 6 wherein a pair of hinges (101) include a stop to limit the movement of the pair of hinges to a desired maximum opening configuration of the stabilizer (41) relative to the stepladder (11).

15. The stabilizer device (41) for a stepladder of claim 1 wherein the mounting structure (51) includes a pair of hingedly connected channel forming members (125, 127), a hinge connection is formed by a hinge (131) suitably secured to the channel forming members (125, 127), the channel forming members (125, 127) are each generally C-shaped having a leg (141, 143) connected to a respective bight portion (145, 147), and arranged generally parallel to and having a length that is shorter than a length of the legs (141, 143), the channel forming members (125, 127) are each provided with a respective second leg (151, 153), spaced from the legs (141, 143) so that a portion of the stepladder (11) step is positioned between the legs (141) and (143) so that hinged movement of the channel forming members (125) (127) can form a snap lock securement to an opposite side of the step (121) to secure the stabilizer device to the stepladder (11).

16. The stabilizer device (41) for a stepladder of claim 1 wherein the sloped surface is stairs.

* * * * *